(12) United States Patent
Noh et al.

(10) Patent No.: US 12,548,161 B2
(45) Date of Patent: Feb. 10, 2026

(54) ELECTRONIC DEVICE PROVIDING IMAGE-BASED IMAGE EFFECT AND METHOD FOR CONTROLLING THE SAME

(71) Applicant: SAMSUNG ELECTRONICS CO., LTD., Suwon-si (KR)

(72) Inventors: Euihwa Noh, Suwon-si (KR); Jiyoon Park, Suwon-si (KR); Sungoh Kim, Suwon-si (KR); Bohee Lee, Suwon-si (KR); Jaehee Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 18/091,960

(22) Filed: Dec. 30, 2022

(65) Prior Publication Data

US 2023/0216978 A1    Jul. 6, 2023

Related U.S. Application Data

(63) Continuation of application No. PCT/KR2022/021077, filed on Dec. 22, 2022.

(30) Foreign Application Priority Data

Jan. 3, 2022   (KR) .......................... 10-2022-0000519

(51) Int. Cl.
 *H04N 5/262*   (2006.01)
 *G06T 5/00*    (2006.01)
 (Continued)

(52) U.S. Cl.
 CPC ................. *G06T 7/11* (2017.01); *G06T 5/00* (2013.01); *G06T 5/70* (2024.01); *G06T 7/194* (2017.01);
 (Continued)

(58) Field of Classification Search
 CPC .... H04N 5/2621; H04N 5/265; H04N 21/854; G06T 5/70; G06T 7/194;
 (Continued)

(56) References Cited

U.S. PATENT DOCUMENTS 10,157,455 B2 * 12/2018  Jeong .................. G06F 3/04842
10,951,826 B2 *  3/2021  Wakana ............. H04N 1/00801
(Continued)

FOREIGN PATENT DOCUMENTS

JP          2019-139775     8/2019
KR     10-2015-0068838     6/2015
(Continued)

OTHER PUBLICATIONS

Search Report and Written Opinion dated Mar. 20, 2023 issued in International Patent Application No. PCT/KR2022/021077.
(Continued)

*Primary Examiner* — Shahbaz Nazrul
(74) *Attorney, Agent, or Firm* — Nixon & Vanderhye, P.C.

(57) ABSTRACT

An electronic device may include a camera, a display, and at least one processor. The at least one processor may be configured to display a first image obtained through the camera in a first area of the display, identify a plurality of areas included in the first image, identify a plurality of image effects applicable to the plurality of areas, display a plurality of second images to which the plurality of image effects are applied, respectively, in a second area adjacent to the first area, and display a third image resulting from applying an image effect corresponding to an image selected from among the plurality of second images to the first image.

17 Claims, 14 Drawing Sheets

(51) Int. Cl.
*G06T 5/70* (2024.01)
*G06T 7/11* (2017.01)
*G06T 7/194* (2017.01)

(52) U.S. Cl.
CPC . *H04N 5/2621* (2013.01); *G06T 2207/10144* (2013.01); *G06T 2207/20104* (2013.01); *G06T 2207/20208* (2013.01); *G06V 2201/07* (2022.01)

(58) Field of Classification Search
CPC . G06T 2207/10144; G06T 2207/20104; G06T 2207/20208; G06T 5/00; G06T 11/60; G06T 7/11; G06V 2201/07; G06F 3/0484
See application file for complete search history.

(56) References Cited

U.S. PATENT DOCUMENTS

| | | | |
|---|---|---|---|
| 2013/0265296 A1* | 10/2013 | Chan | G06T 11/60 345/173 |
| 2014/0176732 A1 | 6/2014 | Cohen et al. | |
| 2016/0127653 A1 | 5/2016 | Lee et al. | |
| 2018/0082715 A1 | 3/2018 | Rymkowski | |
| 2018/0227506 A1* | 8/2018 | Lee | H04N 5/2624 |
| 2018/0285679 A1 | 10/2018 | Amitay | |
| 2019/0251118 A1 | 8/2019 | Ahn et al. | |
| 2019/0279345 A1 | 9/2019 | Kim et al. | |
| 2020/0053293 A1 | 2/2020 | Lee et al. | |
| 2020/0082599 A1* | 3/2020 | Manzari | G06F 3/04847 |
| 2020/0310631 A1* | 10/2020 | Jiang | G06T 11/60 |
| 2020/0344424 A1* | 10/2020 | Lee | H04N 23/12 |
| 2021/0144352 A1 | 5/2021 | Kim et al. | |
| 2021/0248725 A1 | 8/2021 | Kang | |
| 2021/0390673 A1* | 12/2021 | Ban | G06T 5/20 |
| 2022/0108452 A1 | 4/2022 | Xiang et al. | |
| 2022/0108542 A1 | 4/2022 | Zhang et al. | |
| 2024/0331238 A1* | 10/2024 | Pang | G06T 11/60 |

FOREIGN PATENT DOCUMENTS

| | | |
|---|---|---|
| KR | 10-2016-0051390 | 5/2016 |
| KR | 10-2018-0051367 | 5/2018 |
| KR | 10-2018-0116704 | 10/2018 |
| KR | 10-2020-0017310 | 2/2020 |
| KR | 10-2020-0100558 | 8/2020 |
| KR | 10-2021-0030466 | 3/2021 |
| KR | 10-2021-0134945 | 11/2021 |

OTHER PUBLICATIONS

Extended Search Report dated Dec. 19, 2024 in European Application No. 22916611.1.

William a Barrett et al., "Object-Based Image Editing," ACM Transactions On Graphics, vol. 21, No. 3, 2002-07, pp. 777-784.

* cited by examiner

ELECTRONIC DEVICE PROVIDING IMAGE-BASED IMAGE EFFECT AND METHOD FOR CONTROLLING THE SAME

CROSS-REFERENCE TO RELATED APPLICATIONS

This application is a PCT-Bypass Continuation of International Application No. PCT/KR2022/021077 designating the United States, filed on Dec. 22, 2022, in the Korean Intellectual Property Receiving Office and claiming priority to Korean Patent Application No. 10-2022-0000519, filed on Jan. 3, 2022, in the Korean Intellectual Property Office, the disclosures of each of which are incorporated by reference herein in their entireties.

BACKGROUND

Field

The disclosure relates to an electronic device for providing an image-based image effect and a method for controlling the same.

Description of Related Art

Electronic devices such as smart phones can provide an image editing function. For example, an electronic device can allow a user to edit images acquired through a camera or stored in a memory using an image editing program.

The electronic device provides image editing-related functions in various ways to meet the user's preference for the image captured on the camera. As one of such image editing-related functions, the electronic device provides a filter function for changing the properties of an image (e.g., an original image). For example, while displaying an image, the electronic device may display images (e.g., thumbnail images) indicating a plurality of filters individually corresponding to a plurality of attributes of the image. When one image is selected by a user from among the images indicating the plurality of filters, the electronic device may provide an image to which the tone of the image corresponding to the filter indicated by the selected image has been applied.

SUMMARY

A user needs to select a filter appropriate for the atmosphere to be applied to the image. The electronic device only provides filters (or filter functions) created by the manufacturer (or developer) of the camera application or image application (e.g., gallery application). Accordingly, filters (e.g., types of filters) that the electronic device can provide to the user may be limited.

Various embodiments of the disclosure relate to an electronic device for providing an image-based image effect and a method for controlling the same, which may provide an image effect for obtaining an image with the atmosphere desired by the user based on image analysis information.

According to various embodiments, an electronic device may comprise a camera, a display, and at least one processor. The at least one processor may be configured to display a first image obtained through the camera in a first area of the display, identify a plurality of areas included in the first image, identify a plurality of image effects applicable to the plurality of areas, display a plurality of second images to which the plurality of image effects are applied, respectively, in a second area adjacent to the first area, and display a third image resulting from applying an image effect corresponding to an image selected from among the plurality of second images to the first image.

According to various embodiments, a method for providing an image-based image effect by an electronic device may comprise displaying a first image obtained through a camera in a first area of a display of the electronic device, identifying a plurality of areas included in the first image, identifying a plurality of image effects applicable to the plurality of areas, displaying a plurality of second images to which the plurality of image effects are applied, respectively, in a second area adjacent to the first area, and displaying a third image resulting from applying an image effect corresponding to an image selected from among the plurality of second images to the first image.

According to various embodiments, it is possible to provide various image effects for obtaining an image with the user desired atmosphere based on analysis information about the image.

According to various embodiments, it is possible to apply a different image effect to each subject for an image including various subjects, enhancing the user's satisfaction and rendering it possible to obtain an image meeting the user's intent.

According to various embodiments, it is possible to provide capturing information and a composition suitable for capturing in relation to a preview image to capture the user's desired image, thereby allowing the user to obtain an image with a user desired atmosphere.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

The same or similar reference denotations may be used to refer to the same or similar elements throughout the specification and the drawings.

DETAILED DESCRIPTION

Figure 1:
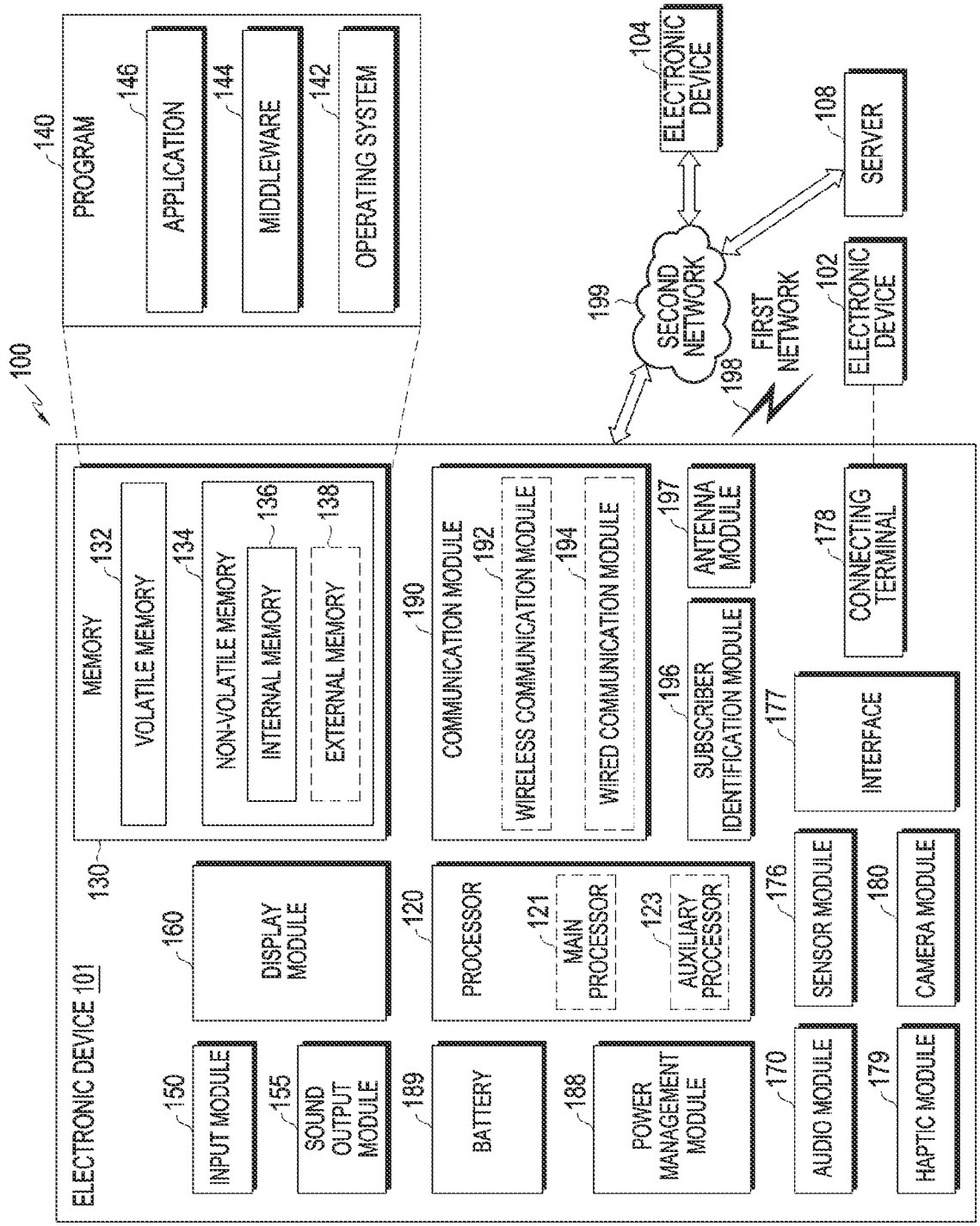
FIG. 1 is a view illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of or including a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
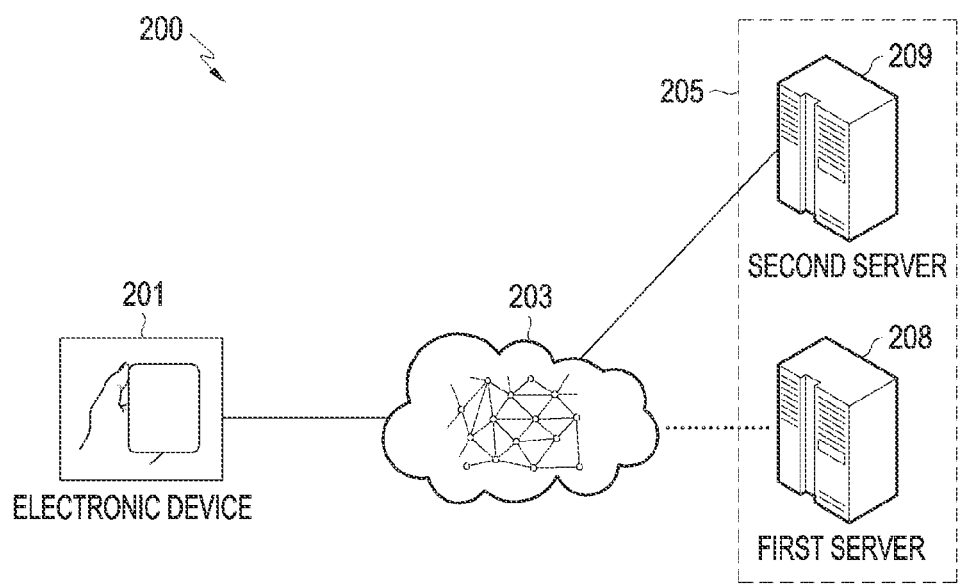
FIG. 2A is a view illustrating an example system configuration for providing an image-based image effect according to various embodiments.

FIG. 2A is a view illustrating an example system configuration for providing an image-based image effect according to various embodiments.

Referring to FIG. 2A, a system 200 for providing an image-based image effect may include an electronic device 201 and at least one server 205 (e.g., the first server 208 or the second server 209). The electronic device 201 of FIG. 2A may include components identical or similar to those of the electronic device 101 of FIG. 1.

According to various embodiments, at least one server 205 may be the server 108 described above in connection with FIG. 1. According to various embodiments, the at least one server 205 may communicate with the user's electronic device 201 through the network 203. The at least one server 205 may include a plurality of servers (e.g., the first server 208 and the second server 209). According to an embodiment, the first server 208 and the second server 209 each may correspond to at least one of a web content providing server, a broadcasting server, an over the top (OTT) server, a cloud server, or a streaming server.

According to various embodiments, the electronic device 201 may display a first image through the display using a camera application. For example, when receiving an input for executing the camera application from the user, the electronic device 201 may display a preview (or live view) image input in real time through the camera, as a first image, through the display. According to various embodiments, the electronic device 201 may display the first image through the display using an image application (e.g., a gallery application).

According to various embodiments, the electronic device 201 may display an image (e.g., an image obtained from a webpage or an image registered (or posted) on a social media service server) obtained from at least one server 205 through the network 203 using a web application or a social media service application, as the first image, through the display.

However, the method of displaying the first image is not limited to the above-described examples. As another example, the electronic device 201 may display an image received through the communication module 190 from an external electronic device or an image shared with the external electronic device, as the first image, through the display. As another example, the electronic device 201 may receive an image, which is obtained in real-time by an external electronic device (e.g., a camera or wearable device connected for communication with the electronic device) connected for communication with the electronic device 201, from the external electronic device and display the received image, as the first image, through the display.

According to an embodiment, the first image may be referred to as an original image, target image, or input image whose image attribute(s) is to be changed using a filter on at least one area in the image. The first image may be referred to, for example, as a reference image that provides an attribute of the image (or from which an attribute of the image is to be extracted) to recommend an image effect in relation to the first image.

According to various embodiments, a plurality of image effects applicable to the first image may be provided by the electronic device 201 or the at least one server 205. According to an embodiment, the electronic device 201 may identify and provide at least one among a plurality of image effects previously stored in the memory 130 to differ depending on at least one attribute value related to the image (or to correspond to at least one attribute value related to the image) according to a result of analysis of the first image.

According to an embodiment, the at least one server 205 may analyze the first image, identify image effects applicable to the first image according to a result of analyzing the first image, and provide the identified image effects to the electronic device 201. As such, the electronic device 201 may analyze the first image, search the memory 130 or at least one server 205 for image effects based on the result of analysis and recommend the image effects, e.g., to a user. Alternatively, the at least one server 205 may analyze images and recommend image effects. The image effect selected by the user may be downloaded and stored in the electronic device 201.

Accordingly, the electronic device 201 may create a plurality of second images to which the searched (or recommended) image effects are respectively applied and display them along with the first image. Based on a user input of selecting at least one from among the plurality of second images, the electronic device 201 may display a third image obtained by applying the image effect corresponding to the selected second image to the first image. As such, a different image effect may be applied to each of at least a partial area of the first image according to the user's selection, and an image to which various image effects have been applied may be provided. Thus, the user may obtain an image with her desired atmosphere and have more satisfaction.

Meanwhile, the user of the electronic device 201 may capture an image using the camera application and provide various functions when capturing an image. In using various functions, it may be more convenient to use an electronic device providing a display with a larger screen or a plurality of displays.

An electronic device including a large-screen display or a plurality of displays may display recommended filters or a selected filter-applied image through the large screen or the plurality of displays, increasing user convenience. For example, the display equipped in the electronic device may be in a foldable or bendable, slidable, or rollable form. In an electronic device including such a display, the size of the display area may be changed as, e.g., a structure forming the electronic device is moved to switch between an opened and closed state. As another example, the electronic device may include a display flexible or foldable about the folding axis.

An example of such large-screen electronic device may be described with reference to FIGS. 2B and 2C.

Figure 2B:
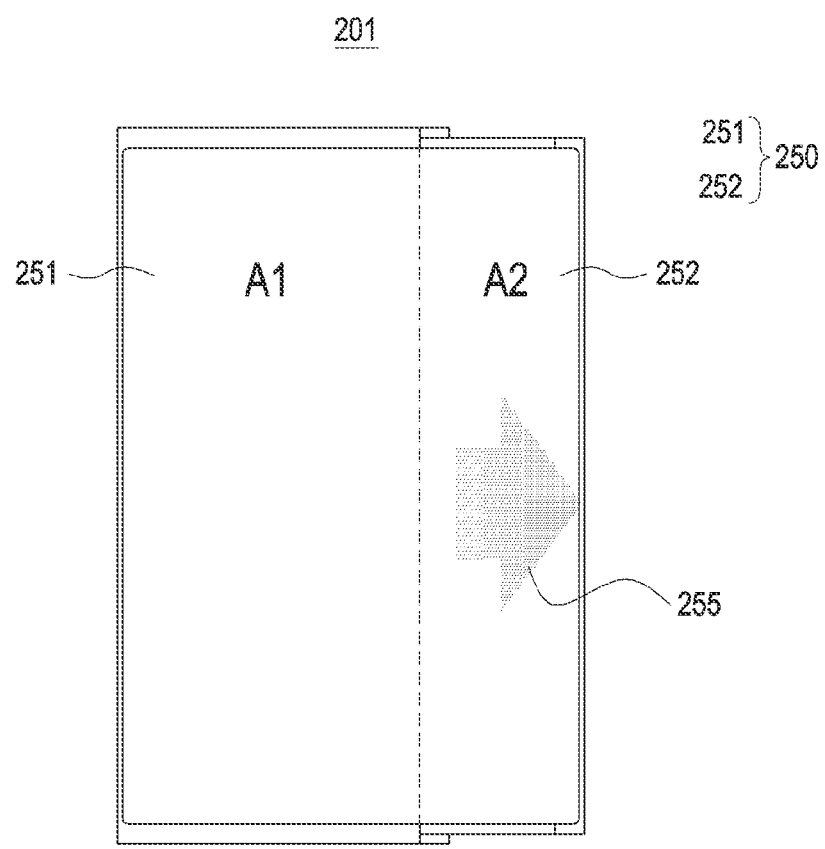
FIG. 2B is a view illustrating an example of an electronic device according to various embodiments.

FIG. 2B is a view illustrating an example of an electronic device according to various embodiments.

Referring to FIG. 2B, the flexible display 250 may include a first portion 251 and a second portion 252, according to an embodiment. Here, the first portion 251 and the second portion 252 are separated for convenience of description, but are not functionally or physically separated from each other. According to another embodiment, the flexible display 250 may include a first area A1 and a second area A2. Here, it should be noted that the first area A1 and the second area A2 are also separated for convenience of description, and are not necessarily functionally or physically separated from each other. According to various embodiments of the disclosure, the portions of the display denoted as 'first portion' and 'second portion' or denoted as 'first area' and 'second area' may have substantially the same or similar configurations.

As shown in FIG. 2B, in the slide-out state of the flexible display 250, a normal use area (e.g., first area A1) may be formed on the left side which is the opposite to the extending direction of the flexible display 250, and an extended area (e.g., second area A2) may be formed on the right side of the flexible display 250. As another example, when the flexible display 250 extends in a direction opposite to the first direction 255, an extended area (e.g., second area A2) may be formed on the left side of the flexible display 250.

As the flexible display 250 moves in the first direction 255 with respect to the housing, at least a partial area thereof may be slid out from the inside of the housing so that the size of the visually exposed area may be extended. For example, the first area A1 may be an area viewed from the outside in a state in which the flexible display 250 is not extended. The second area A2 may be an area which is at least partially surrounded by the housing not to be viewed from the outside in the non-extended state and, as the flexible display 250 is extended, is viewed from the outside through at least one surface of the housing.

According to various embodiments, the first area A1 may display a first image (or original image), and the second area A2 may display second images indicating recommended image effects in relation to a result of analysis of the first image, when a camera application is running. Further, when at least one image is selected from among the second images indicating the recommended image effects, an image obtained by applying the selected image effect to a corresponding area of the first image may be displayed in the first area A1.

According to various embodiments, when the user touches an object (e.g., filter menu or icon) indicating an image effect function while the first image is being displayed, the electronic device 201 may extend at least a partial area of the flexible display 250 by an automatic slide-out operation. Alternatively, it may be extended by the automatic slide-out operation in response to the completion of a search for recommended image effects while the first image is displayed. Further, accordingly, the second images indicating recommended image effects may be displayed in the second area A2 which is the extended area and, in response to a selection of an image effect, may be shrunken by an automatic slide-in operation.

Figure 2C:
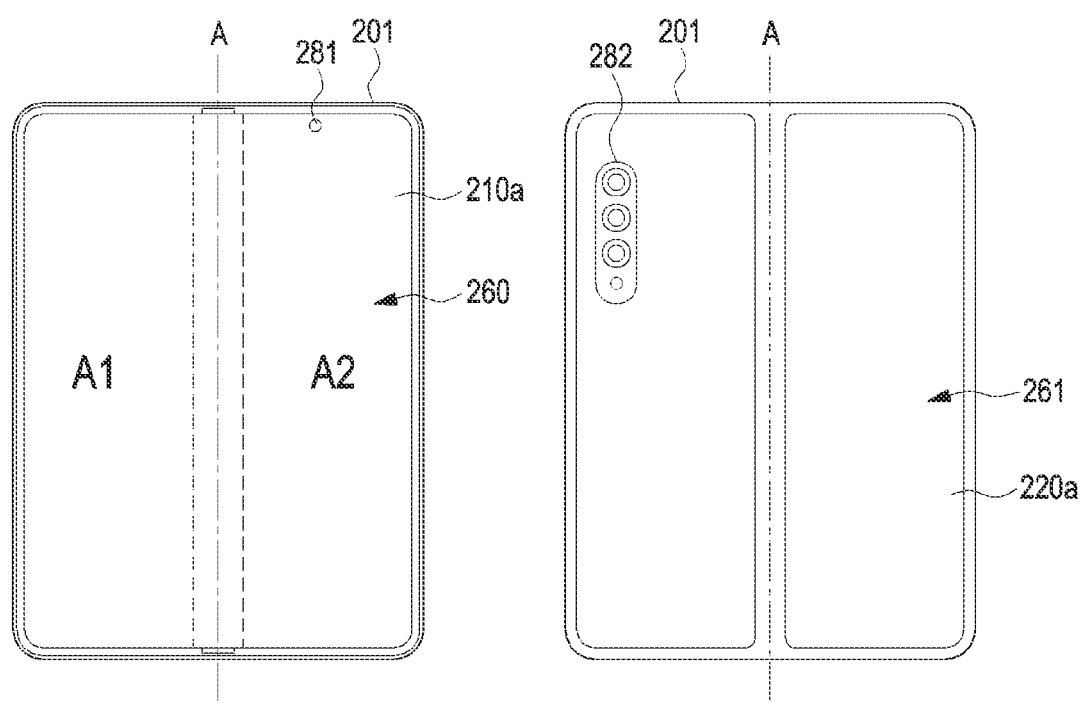
FIG. 2C is a view illustrating another example of an electronic device according to various embodiments.

FIG. 2C is a view illustrating another example of an electronic device according to various embodiments.

Referring to FIG. 2C, in an embodiment, an electronic device 201 may include a foldable housing and a flexible or foldable display 260 disposed in a space formed by the foldable housing. The foldable housing may have a substantially symmetrical shape about a folding axis (e.g., axis A). According to an embodiment, the surface where the flexible display 260 is disposed may be defined as a first surface 210a of the electronic device 201, and the surface opposite to the first surface 210a may be defined as a second surface 220a. For example, the front camera 281 may be provided on the first surface 210a of the electronic device 201, and the rear camera 282 may be provided on the second surface 220a.

As shown in FIG. 2C, the first display 260 may be formed to occupy the entire first surface 210a of the electronic device 201, and the second display 261 may be formed to occupy at least a portion of the second surface 220a. In this case, the first display 260 may pivot through a separate hinge module, and the second display 261 may be fixed to the housing.

According to an embodiment, the first display 260 may mean a flexible display, at least a portion of which may be transformed into a flat or curved surface. The first display 260 may include a first area disposed on one side of the folding axis (e.g., axis A) and a second area disposed on the opposite side of the folding axis. For example, when the electronic device 201 is in an unfolded state (e.g., a flat state), the surface of the first area and the surface of the second area may form 180 degrees therebetween and face in the same direction (e.g., the forward direction of the electronic device 201).

According to various embodiments, the first area A1 of the first display 260 may display a first image (or original image), and the second area A2 may display second images indicating recommended image effects in relation to the result of analysis of the first image, when the camera application is running.

Figure 3:
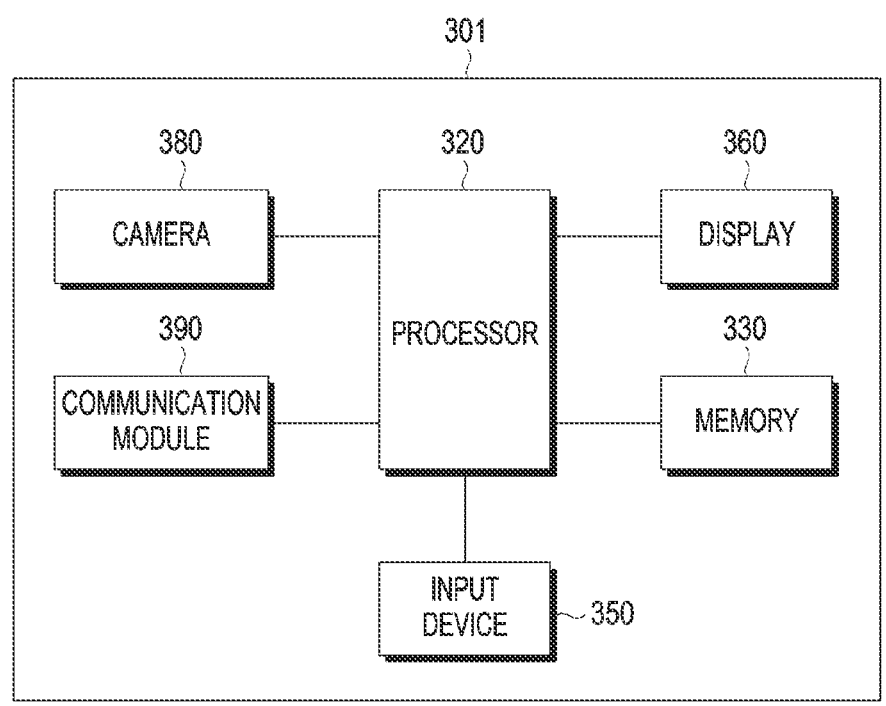
FIG. 3 is a block diagram illustrating an internal configuration of an example electronic device according to various embodiments.
Figure 4:
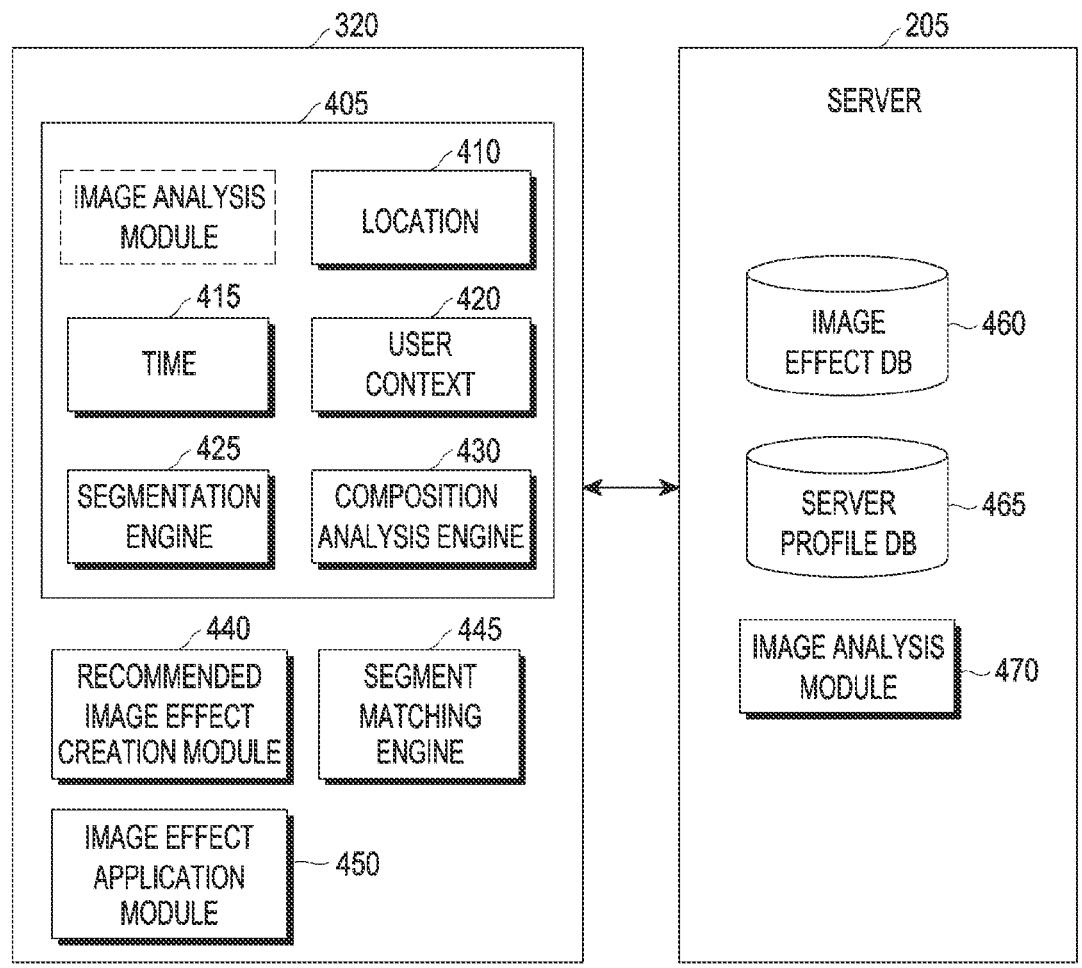
FIG. 4 is a view illustrating a detailed configuration for providing an example image-based image effect according to various embodiments.

FIG. 3 is a block diagram illustrating an internal configuration of an example electronic device according to various embodiments. FIG. 3 is described with reference to FIG. 4. FIG. 4 is a view illustrating a detailed configuration to provide an example image-based filter according to various embodiments.

Referring to FIG. 3, according to various embodiments, an electronic device 301 (e.g., the electronic device 201 of FIGS. 1 and 2) may include a communication module 390 (e.g., the communication module 190 of FIG. 1) to communicate with a server (e.g., the server 108 of FIG. 1 and at least one server 205 of FIG. 2), a processor 320 (e.g., the processor 120 of FIG. 1) operatively connected with the communication module 390, and a memory 330 (e.g., the memory 130 of FIG. 1) operatively connected to the communication module 390 and the processor 320. The electronic device 301 may also include an input device 350 (e.g., the input module 150 of FIG. 1), a display 360 (e.g., the display module 160 of FIG. 1), and a camera 380 (e.g., the camera module 180 of FIG. 1). Not all of the components of FIG. 3 are essential components of the electronic device 101, and the electronic device 101 may be implemented with more or fewer components than the components of FIG. 3.

According to various embodiments, the memory 330 may store a control program for controlling the electronic device 301, a UI related to an application downloaded from the outside or provided by the manufacturer and images for providing the UI, user information, documents, databases, or related data.

For example, the memory 330 may store a plurality of image effects applicable to the first image and may store image effects downloaded from the server 205.

According to various embodiments, the processor 320 may obtain the first image using the camera 380, identify the first image stored in the memory 330, or obtain the first image through the communication module 390. As such, there is no limitation to the method by which the electronic device 301 obtains the first image.

According to various embodiments, the processor 320 may segment the first image into a plurality of areas by analyzing the obtained first image while the first image is displayed. For example, the image analysis operation may be performed by an image analysis module 405 in the electronic device 301, but may alternatively be performed by the image analysis module 470 in the server 205.

First, an example in which the image analysis operation is performed by the server 205 is described.

Referring to FIG. 4, according to various embodiments, the processor 320 may transfer information about the first image, obtained upon obtaining the first image, to the server 205 through the communication module 390. The image analysis module 470 of the server 205 may analyze the first image based on the information about the first image and provide a plurality of image effects based on the information about the first image to the electronic device 301. Accordingly, the processor 320 may create a plurality of second images to which the plurality of image effects have been applied and display them, together with the first image, on the display 360 so that the user may view the image effects applicable in relation to the first image. For example, the first image may be displayed in the first area (e.g., the first area A1 of FIG. 2B) on the display 360, and the plurality of second images may be displayed in the second area (e.g., the second area A2 (or extended area) of FIG. 2B) adjacent to the first area.

Here, the information about the first image may include at least one of capture time, capture location, weather, or user context information about the first image. For example, the user context information may include information about the user's schedule, user address book information, user preference information, and/or information about what the user is currently doing. Further, the processor 320 may obtain the capture location based on the GPS coordinates during capture and provide information, such as the capture place or weather, to the server 205. In addition thereto, the information about the first image may include the first image itself (i.e., the original image) used for image analysis by the image analysis module 470.

For example, the image analysis module 470 in the server 205 may search for and recommend image effects related to the first image based on the information about the first image. To provide image effects suitable for an atmosphere to be applied to the first image, learning of the image effects may be performed using artificial intelligence. The image analysis module 470 may provide image effects as a result of the learning.

As an example, the image analysis module 470 may determine image effects, such as filter, composition, camera exposure adjustment, white balance, high dynamic range (HDR) correction, and noise correction, suitable for the first image using the information about the first image, such as capture time, capture place, or landmark, among the plurality of image effects stored in the image effect DB 460. As another example, the image analysis module 470 may determine image effects among the plurality of image effects stored in the image effect DB 460 using a profile stored in the server profile DB 465, e.g., the user preference information related to the first image.

The image effect DB 460 may store a plurality of image effects to provide various image effects to the electronic device 301. The image effects may be updated through learning. For example, the server 205 may update the image effects or create a new image effect based on the data obtained by learning the filter values of photos shared on SNS.

The server profile DB 465 may store profiles for recommending image effects according to individual preferences, degree of sharing, followers' accounts, preference analysis data, genders, races, and/or ages.

Meanwhile, although it has been described above that the image analysis operation is performed by the server 205, the image analysis operation may be performed by the electronic device 301.

To that end, referring to FIG. 4, the electronic device 301 may include an image analysis module 405. FIG. 4 is an example of a case in which the image analysis module 405 is included in the processor 320. However, according to an embodiment, the image analysis module 405 may be at least part of the processor 320 or may be a component operated independently from the processor 320. For example, the image analysis module 405 may be included in an image signal processor performing image processing on the image obtained through the camera 380.

When the image analysis module 405 is configured as a separate component from the processor 320, the image processed by the image analysis module 405 may be displayed through the display 360, as it is or after undergoing additional image processing, by the processor 320. The images which have undergone additional image processing, e.g., image effect-applied images, may be displayed through the display 360. The operations of the processor 320 are described below in detail.

According to various embodiments, the operation of the processor 320 may be performed by each module (or engine). For example, the operation of the processor 320 may be performed by an image analysis module 405, a segmentation engine 425, a composition analysis engine 430, a recommended image effect creation module 440, a segment matching engine 445, and/or an image effect application module 450. Hereinafter, the description focuses primarily on the processor 320.

According to various embodiments, the processor 320 may analyze the first image obtained through the camera 380 (e.g., image sensor) to identify at least one subject and the background and segment the first image into a plurality of areas based on the at least one subject and the background. For example, the at least one subject may include a main subject (or main object) and auxiliary subject (or auxiliary object), may correspond to the subjects (e.g., figures or things) included in the first image, and the rest of the first image except for the at least one subject may correspond to the background.

The image analysis and segmentation operations may be performed by the image analysis module 405 and the segmentation engine 425, respectively. According to an embodiment, the image analysis module 405 may detect the first image itself, that is, a subject included in the first image, but may alternatively analyze attributes including at least one of attribute values of the first image, e.g., the color tone, brightness, saturation, image complexity, contrast, sharpness, shadow, or color temperature of the first image. The attribute value of the first image may be used when the recommended image effect creation module 440 provides (or recommends) an applicable image effect based on the attribute value of the corresponding area of the first image. In addition thereto, location 410, time 415, and/or user context 420 may be further used in identifying the image effect associated with the first image. For example, the image analysis module 405 may analyze the capture location, capture time, and capture context at the time of capturing the first image, and the results of analysis may be used when the recommended image effect creation module 440 provides (or recommends) the image effect suitable for the context when the first image is captured.

According to various embodiments, the processor 320 may identify the areas respectively including the main object, auxiliary object, and/or background through image analysis.

The processor 320 may identify the image effects respectively applicable to the areas of the first image based on the image analysis results. According to an embodiment, the processor 320 may recommend image effects applicable to the first image based on the main object, auxiliary object, and/or background. Further, the processor 320 may recommend the image effects applicable to the first image using such information as the capture time, capture place, and/or user context, as well as the subjects included in the first image, as a result of image analysis. For example, the processor 320 may recommend a corresponding image effect among the image effects stored in the memory 330 or may receive new image effects from the server 205 to create and display a preview image to which a new image effect has been applied. As such, the processor 320 may recommend image effects considering various pieces of information (e.g., location, time, and/or user context) when captured, as well as the subjects included in the first image. For example, since the electronic device 301 may receive new image effects in association with the first image, such as SNS information (e.g., 'likes' or 'shared' photos), current time period, landmarks, through communication with the server 205, the user may select and apply image effects similar to the photos of others with similar SNS preferences upon capturing and may thus obtain a resulting image with a desired atmosphere. This is described below in detail with reference to FIG. 7B.

According to various embodiments, the processor 320 may identify at least one piece of subject information included in the image analysis result image. For example, the subject information may refer, for example, to information (e.g., eyes, eyebrows, and/or lips included in the subject's face) related to the subject (e.g., the face of a figure) included in the image. Accordingly, the processor 320 may determine that the main object is a figure based on the subject information.

Further, when a plurality of subjects are included in the image as a result of image analysis, the processor 320 may determine that the remaining subjects other than the main object (e.g., a person) are auxiliary objects. Further, the processor 320 may determine that the rest (remainder) except from the main object and auxiliary objects in the image analysis result image are the background.

According to various embodiments, the processor 320 may identify an image effect based on information about the area including the main object. For example, the processor 320 may identify image effects (e.g., a beauty filter, white balance, noise adjustment centered on the figure's face) applicable to the figure, based on the figure information. For example, the processor 320 may identify image effects applicable to the first image based on a specific place (e.g., a landmark) included in the first image.

According to various embodiments, the processor 320 may identify the areas respectively including the main object, the auxiliary object, and/or the background through image analysis and may sequentially (or in parallel) provide the image effects based on each of the main object, auxiliary object, and background. For example, the processor 320 searches the memory 330 for, or receives from the server 205, image effects based on the area including the main object and displays the second images to which the image effects are respectively applied, on the display 360. Subsequently, the processor 320 may display the second images to which the image effects based on the area including the auxiliary object next in order are applied, on the display 360. As such, the processor 320 may recommend the image effects respectively applicable to the areas in the first image based on the image analysis results. The recommendation of the image effects may be performed by the recommended image effect creation module 440.

According to an embodiment, the image segmentation may be performed in more detail if necessary. For example, applicable image effects may vary depending on segmentation conditions, e.g., the face and the body for a figure, the upper body and lower body for the body, and a solo or group photo for a figure.

Meanwhile, when taking a photo, the user may identify the subject through the viewfinder. Thus, the user may shoot a photo so that the subject is in an appropriate position in the frame. Meanwhile, upon taking a selfie, the user presses the capture button with the camera-equipped electronic device positioned to face the user. In other words, selfie taking may be done while the user identifies the capture status through the preview image for the subject through the viewfinder. The composition analysis engine 430 may suggest image effects including a recommended capture composition upon recommending the image effects related to the first image so that the user may take a photo in the optimal capture composition. Further, for landscape-oriented image capture rather than selfie taking, the processor 320 may recommend image effects specified for the composition and scene to recommend image effects corresponding to the corresponding image. For example, the processor 320 may use at least one of the recommended image effects to adjust the camera exposure value or the degree of noise or determine the capture conditions (e.g., EV value range and number of photos combined) for HDR capture. As such, the processor 320 may provide capturing information and a composition suitable for capturing in relation to a preview image to capture the user's desired image, thereby allowing the user to obtain an image with the recommended capture composition and the image effect in the capture composition.

According to various embodiments, the processor 320 may receive an input for selecting at least one image effect by the user through the input device 350 and display a third image (e.g., result image), resulting from applying the selected image effect to the first image (e.g., original image). For example, the user may select a plurality of image effects for at least a partial area of the first image, and the processor 320 may display the result image obtained by applying the selected image effect to each area in the first image. As the user so selects the image effect, the processor 320 may display the result image obtained by applying a different image effect to each area in the original image.

According to various embodiments, the processor 320 may receive a designation of a partial area of a plurality of areas of the first image based on a user input through the input device 350. Accordingly, the processor 320 may apply the image effect selected by the user to the designated area. In this case, upon designating the partial area based on the user input, the processor 320 may recommend a plurality of image effects in relation to the designated area. Accordingly, the processor 320 may apply the image effect selected from among the plurality of image effects to the designated partial area, obtaining the user's desired result image. The user may apply the selected image effect to the designated partial area of the first image or may apply the selected image effect to the entire first image. The image effect application operation may be performed by the image effect application module 450.

Meanwhile, when the user selects any one of the second images while the plurality of second images to which the plurality of image effects have been applied are displayed, the processor 320 may match and apply the portion corresponding to the image effect corresponding to the selected image to the corresponding area of the first image. The matching operation may be performed by the segment matching engine 445.

According to various embodiments, an electronic device 301 may comprise a camera 380, a display 360, and at least one processor 320 (e.g., including processing circuitry). The at least one processor 320 may be configured to display a first image obtained through the camera 380 in a first area of the display 360, identify a plurality of areas included in the first image, identify a plurality of image effects applicable to the plurality of areas, display a plurality of second images to which the plurality of image effects are applied, respectively, in a second area adjacent to the first area, and display a third image resulting from applying an image effect corresponding to an image selected from among the plurality of second images to the first image.

According to various embodiments, the third image may be obtained by applying the image effect corresponding to the selected image to one of the plurality of areas included in the first image.

According to various embodiments, the at least one processor may be configured to provide information about the first image to a server, obtain the plurality of image effects based on the information about the first image from the server, and provide the plurality of second images to which the plurality of image effects are applied.

According to various embodiments, the information about the first image may include at least one of a capture time, capture place, weather, or user context information about the first image.

According to various embodiments, the at least one processor may be configured to recognize at least one object in the first image, segment the first image into a main object, an auxiliary object, and a background based on a result of the recognition, and identify the plurality of areas respectively including the main object, the auxiliary object, and the background.

According to various embodiments, the at least one processor may be configured to designate a partial area among the plurality of areas of the first image based on a user input, and apply an image effect corresponding to the image selected from among the plurality of second images to the designated partial area of the first image.

According to various embodiments, the at least one processor may be configured to provide information about the designated partial area of the first image to a server, obtain a plurality of image effects based on the information about the designated area of the first image from the server, and provide the plurality of second images to which the plurality of image effects are applied.

According to various embodiments, the plurality of second images may be images in which a different image effect is applied to each of the plurality of areas.

According to various embodiments, the plurality of image effects may include at least one of a filter, white balance, camera exposure value adjustment, high dynamic range (HDR) correction, or noise correction.

According to various embodiments, the at least one processor may be configured to, in response to a plurality of images being selected from among the plurality of second images, display the third image resulting from applying image effects corresponding to the selected images to respective corresponding areas among the plurality of areas included in the first image.

Figure 5:
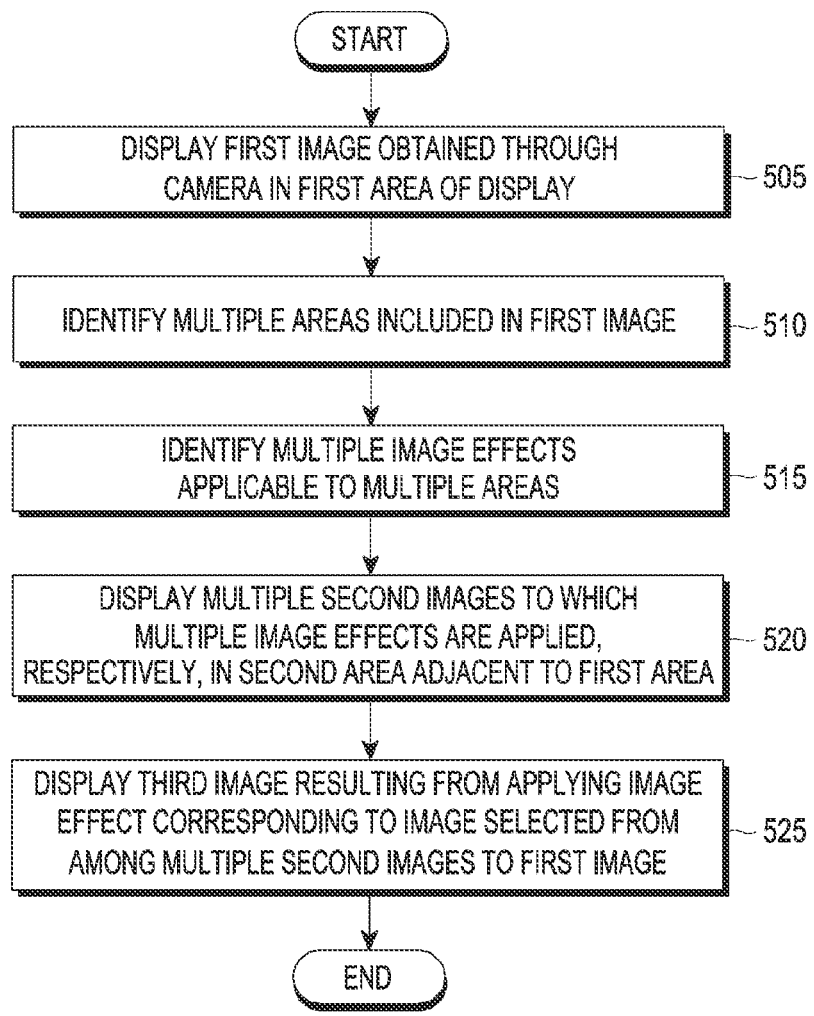
FIG. 5 is a flowchart illustrating operations of an example electronic device according to various embodiments.

FIG. 5 is a flowchart illustrating operations of an example electronic device according to various embodiments.

Referring to FIG. 5, the operation method may include operations 505 to 525. Each step/operation of the operation method of FIG. 5 may be performed by an electronic device (e.g., the electronic device 101 of FIG. 1, the electronic device 201 of FIGS. 2A, 2B, and 2C, or the electronic device 301 of FIG. 3) or at least one processor (e.g., at least one of the processor 120 of FIG. 1 or the processor 320 of FIG. 3) of the electronic device.

In operation 505, the electronic device 301 may execute a camera application and display a first image obtained through the camera in a first area of the display.

In operation 510, the electronic device 301 may identify a plurality of (multiple) areas included in the first image. For example, the electronic device 301 may identify the presence of a request for providing an image effect associated with the first image from the user when receiving an input by an execution icon (e.g., an object, a graphic element, a menu, a button, or a shortcut image) representing the image effects displayed on the screen, a designated button input, or a designated gesture input and perform analysis of the first image.

According to an embodiment, the operation of identifying the plurality of areas included in the first image may include the operation of recognizing at least one object in the first image, the operation of segmenting the first image into a main object, an auxiliary object, and a background, and the operation of identifying the plurality of areas respectively including the main object, the auxiliary object, and the background.

In operation 515, the electronic device 301 may identify a plurality of image effects applicable to the plurality of (multiple) areas.

According to an embodiment, analysis of the first image may be performed by the server 205, and the electronic device 301 may receive the image analysis result from the server 205.

According to an embodiment, the electronic device 301 may provide information about the first image to the server 205 and, after obtaining the plurality of image effects based on the information about the first image from the server 205, provide the plurality of second images to which the plurality of image effects are applied. According to an embodiment, the information about the first image may include at least one of capture time, capture location, weather, or user context information about the first image.

In operation 520, the electronic device 301 may display the plurality of second images to which the plurality of image effects are respectively applied in the second area adjacent to the first area.

In operation 525, the electronic device 301 may display a third image obtained by applying the image effect corresponding to the image selected from among the plurality of second images to the first image. According to an embodiment, the third image may be obtained by applying the image effect corresponding to the selected image to one of the plurality of areas included in the first image.

According to an embodiment, the operation of displaying the third image may include the operation of, when a plurality of images are selected from among the plurality of second images, displaying the third image obtained by applying the image effects corresponding to the selected images to respective corresponding areas of the plurality of areas included in the first image.

According to an embodiment, the electronic device 301 may designate a partial area among the plurality of areas of the first image based on a user input and apply the image effect corresponding to the image selected from among the plurality of second images to the designated partial area of the first image.

According to an embodiment, the electronic device 301 may provide information about the designated partial area of the first image to the server, obtain, from the server, a plurality of image effects based on the information about the designated partial area of the first image, and create the plurality of second images to which the plurality of image effects are applied.

According to an embodiment, the plurality of second images may be images obtained by applying a different image effect to each of the plurality of areas.

According to an embodiment, the plurality of image effects may include at least one of a filter, white balance, camera exposure value adjustment, high dynamic range (HDR) correction, or noise correction.

Figure 6:
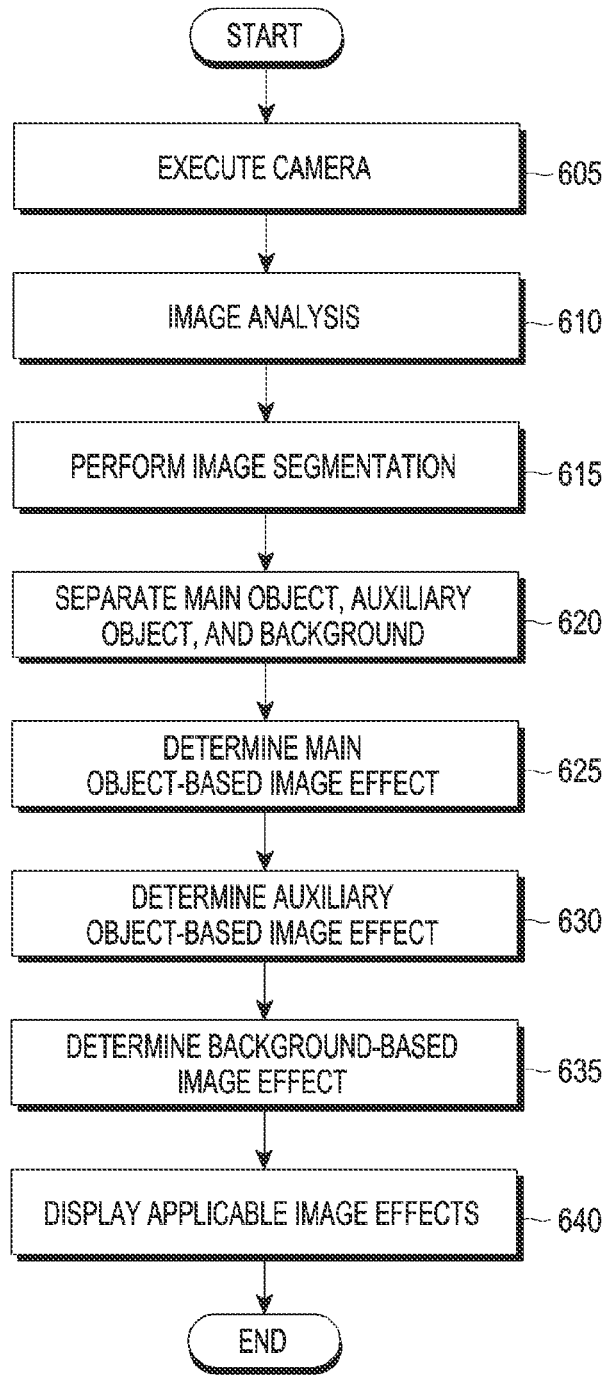
FIG. 6 is a flowchart illustrating an operation for providing example image effects related to an object included in an image according to various embodiments.
Figure 7A:
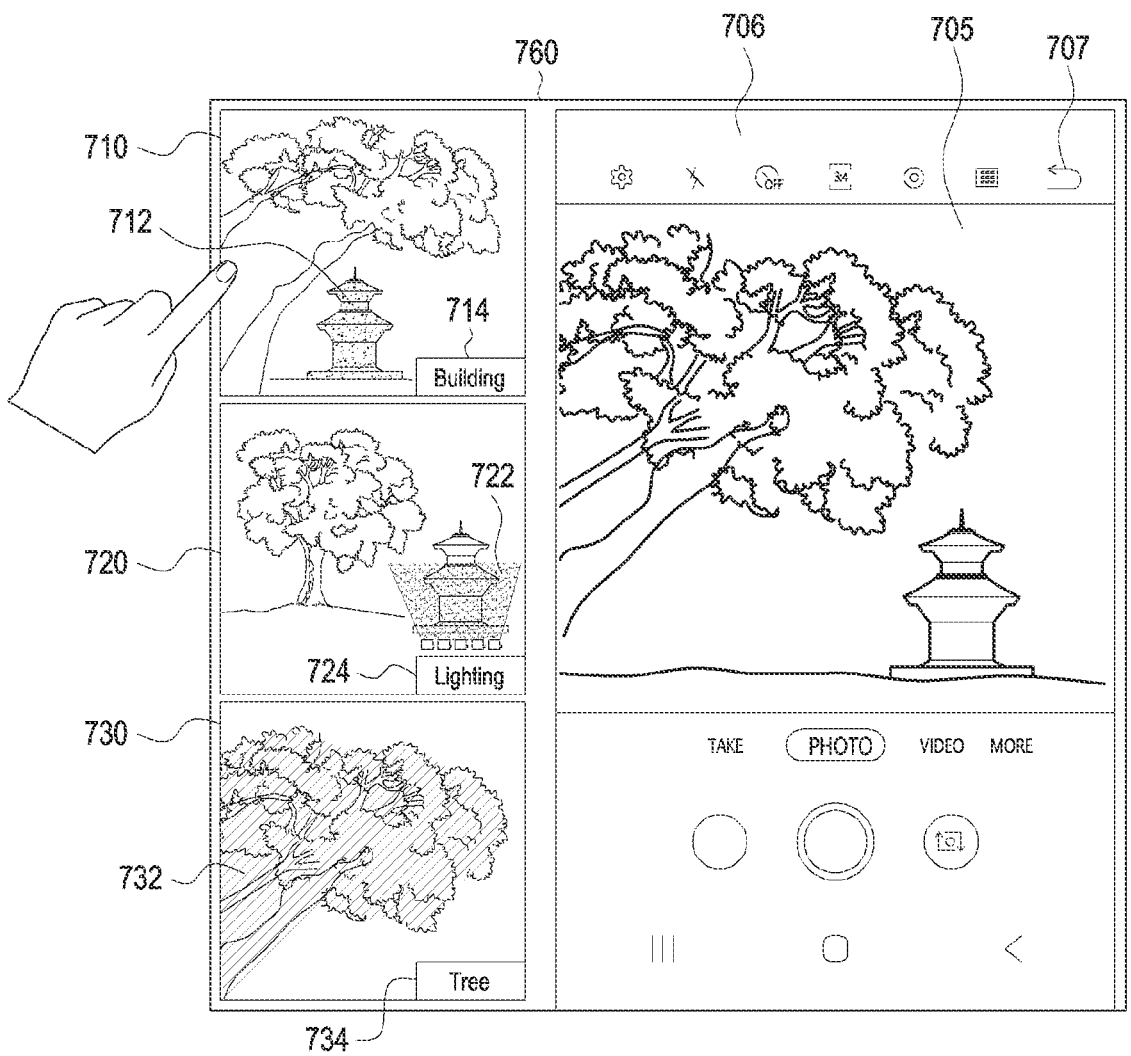
FIG. 7A is a view illustrating an example screen displaying image effects that are respectively applicable to objects included in an image according to various embodiments.
Figure 7B:
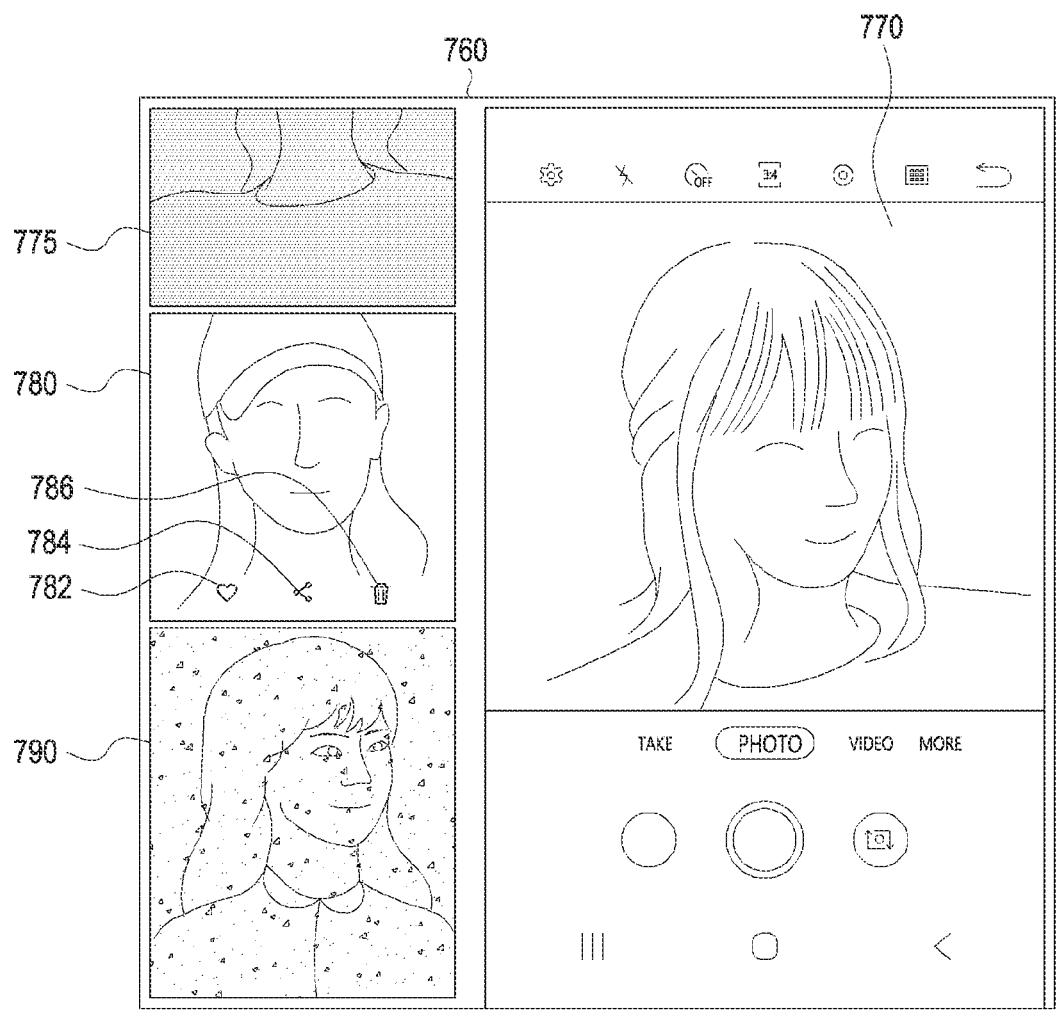
FIG. 7B is a view illustrating an example screen displaying image effects that are applicable to a figure image according to various embodiments.

FIG. 6 is a flowchart illustrating an example operation for providing image effects related to an object included in an image according to various embodiments. FIG. 6 is described with reference to FIGS. 7A and 7B for a better understanding. FIG. 7A is a view illustrating an example screen displaying image effects that are respectively applicable to objects included in an image according to various embodiments. FIG. 7B is a view illustrating an example screen displaying image effects that are applicable to a figure image according to various embodiments.

Referring to FIG. 6, in operation 605, the electronic device 301 may execute a camera and, in operation 610, analyze the first image, and in operation 615, perform image segmentation. In operation 620, the electronic device 301 may separate the main object, the auxiliary object, and the background included in the first image. For example, the electronic device 301 may identify the subjects included in the first image and analyze the context for the relationship between the main subject (or main object) and the auxiliary subject (or auxiliary object). Further, the electronic device 301 may separate the background area which is the remaining area except for the identified subjects and separately perform analysis on the background area.

In operation 625, the electronic device 301 may determine an image effect based on the main object. In operation 630, the electronic device 301 may determine an image effect based on the auxiliary object. In operation 635, the electronic device 301 may determine an image effect based on the background. As described above, the electronic device 301 may search for and determine corresponding image effects based on the segmentation information about the image. For example, the electronic device 301 may receive image effects from the server 205 by querying an image related to each thereof. Such queries may be performed sequentially or in parallel or simultaneously, but the order is not limited thereto.

In operation 640, the electronic device 301 may display applicable image effects. According to an embodiment, the electronic device 301 may display applicable image effects based on the order of responses to the queries and the order of the image effects based on the main object, auxiliary object, and background.

Referring to FIG. 7A, the first image 705 may be displayed in the first area of the display 760 of the electronic device 301, and second images 710, 720, and 730 to which image effects associated with the first image 705 are applied may be displayed in the second area, based on the result of image analysis for the first image 705. Among the second images 710, 720, and 730, the first second image 710 has an image effect-applied main object 712 and may include guide information 714 to allow the user to know that the image effect-applied object 712 is a 'building.' The second second image 720 exemplifies guide information 724 indicating that the applicable image effect 722 is 'lighting' and the third second image 730 has an image effect-applied auxiliary object 732 and may include guide information 734 indicating that the image effect-applied object 732 is a 'tree.' FIG. 7A illustrates an example in which the guide information 714, 724, and 734 is displayed, but the guide information may not be displayed. The guide information 714, 724, and 734 may be displayed not in text, but in the form of an icon to indicate a corresponding object in relation to each object. Further, for each image 710, 720, and 730, the image effect applicable to each object may be depicted in a different form, such as a dotted line surrounding the corresponding object, color, brightness, or saturation. For example, to indicate that an image effect has been applied to the object corresponding to the 'building' in the first second image 710, the area corresponding to the object may be depicted in a dotted line. By so doing, the user may identify what effect has been applied to each of the second images 710, 720, and 730 related to the first image 705 or each object and may thus easily select a desired image. According to an embodiment, user inputs for selecting, applying, and identifying at least one of the second images 710, 720, and 730 indicating the image effects may be implemented through the user's various gestures. For example, a corresponding image effect may be applied to the first image 705 through various user inputs, such as a touch input, touch-and-drag, double tap, or swipe, for the user to touch any one of the second images 710, 720, and 730.

According to an embodiment, the electronic device 301 may provide a panel 706 including an edit function item (e.g., an undo item 707) to enable user settings for the first image 705. For example, the panel 706 may include various control items related to capture and may include a cancel all item and a redo item as well as the undo item 707, but the type of control items are not limited thereto. The user may select the undo item 707 to sequentially cancel the executions or, alternatively, may selectively cancel the applied image effects through a touch input, e.g., selecting a corresponding object for the first image 705.

Referring to FIG. 7B to describe an example of capturing a figure, the first image (e.g., figure (or user) image) 770 may be displayed in the first area of the display 760 of the electronic device 301, and second images 775, 780, and 790 recommended in association with the first image 770 may be displayed in the second area based on the image analysis result for the first image 770.

According to an embodiment, the electronic device 301 may real-time analyze the first image 770 in the preview state and obtain the second images 775, 780, and 790 recommended using an SNS application. For example, the electronic device 301 may fetch, in real-time, photos shared on SNS from a corresponding server (e.g., the server 205) in relation to the figure photo. Here, the recommended second images 775, 780, and 790 may correspond to image effects recommended according to various pieces of information related to the figure, e.g., preference, degree of sharing, follower account, preference analysis data, gender, race, and/or age.

According to an embodiment, the electronic device 301 may identify image effects (e.g., a beauty filter, white balance, noise adjustment centered on the figure's face) applicable to the figure, based on the figure information.

For example, the first second image 775 may be an image indicating a first capture composition and a first image effect (e.g., white balance filter effect), the second second image 780 may be an image indicating a second capture composition and a second image effect (e.g., beauty filter effect), and the third second image 790 may be an image indicating a third capture composition and a third image effect (e.g., blurring filter effect). As such, the recommended second images 775, 780, and 790 may be images that propose the capture composition (or capture pose) as well as the filter effect.

Further, the electronic device 301 may display items for selecting 'like' 782 and 'share' 784 for the corresponding image to be able to share the second image corresponding to the recommended image effect with other users and may also display a 'delete' item 786. Thus, the user may select and apply image effects similar to the photos of others who have a similar SNS preference to the user, upon capture, and may thus obtain an image with a desired atmosphere.

Figure 8:
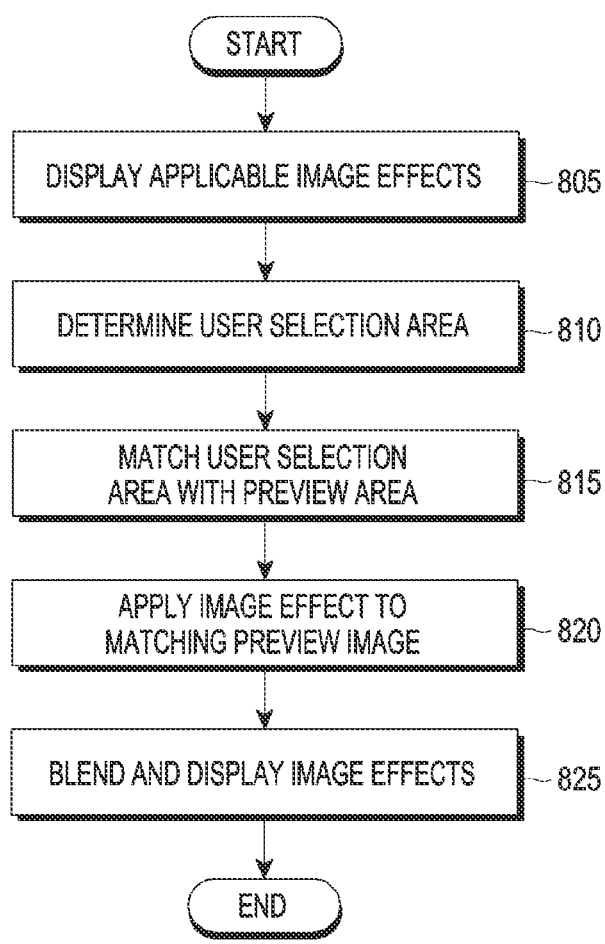
FIG. 8 is a flowchart illustrating an example operation for providing image effects per user selected area according to various embodiments.
Figure 9:
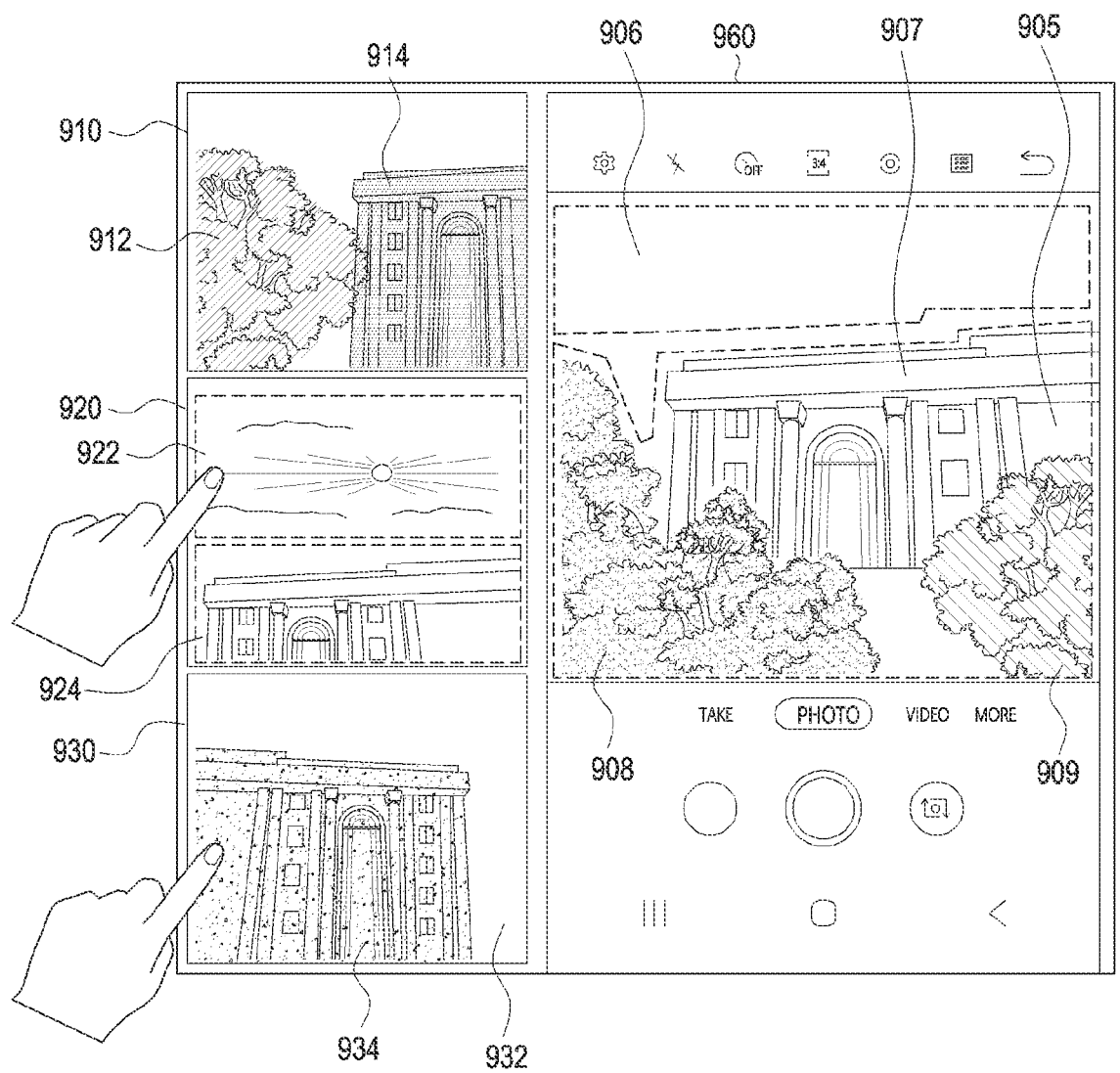
FIG. 9 is a view illustrating an example screen displaying image effects that are applicable per image area according to various embodiments.

FIG. 8 is a flowchart illustrating an example operation for providing image effects per user selected area according to various embodiments. Described in connection with FIG. 8 is an example in which the electronic device 301 displays image effects applicable to the image input in real-time using a camera application or the image displayed using an image application. FIG. 8 is described with reference to FIG. 9 for a better understanding. FIG. 9 is a view illustrating an example screen displaying image effects that are applicable per image area according to various embodiments.

Referring to FIG. 8, in operation 805, the electronic device 301 may display applicable image effects. In operation 810, a user selection area may be determined. For example, the electronic device 301 may determine a user selection area in response to a user input (e.g., touch input) through the input device 350 for designating at least a partial area in the first image. In operation 815, the electronic device 301 may match the user selection area with the preview area. In operation 820, the electronic device 301 may apply an image effect to the matched preview area and, in operation 825, the electronic device 301 may blend the image effects and display an image in the blended image effects. For example, different image effects may be applied to user selection areas, respectively. The electronic device 301 may display a final image (or preview image) in which the different image effects have been blended. Accordingly, when the user presses the capture button in the preview state, the electronic device 301 may save the final image in which the image effects have been blended.

Referring to FIG. 9, the first image 905 may be displayed in the first area of the display 960 of the electronic device 301, and second images 910, 920, and 930 to which image effects associated with the first image 905 are applied may be displayed in the second area, based on the result of image analysis for the first image 905. Here, the objects 914, 924, and 934 included in the second images 910, 920, and 930 may be the same as the object 907 included in the first image 905. Alternatively, the second images 910, 920, and 930 including objects similar to the object 907 included in the first image 905 may be displayed.

The first second image 910 among the second images 910, 920, and 930 is an example of a case in which different image effects are applied to the main object 914 and the auxiliary object 912. The second second image 920 is an example of a case in which the background area 922 and the object area 924 are divided from each other. The third second image 930 is an example of a case in which different image effects are applied to the main object area 934 and the background area 932. In this case, the selected area may be displayed in a guide line (e.g., a dotted line) for the selected area (or the designated area) so that the user's selected area or the designated area set by the user may be recognized.

According to an embodiment, when the user selects the background area 922 in the second second image 920, an image effect corresponding to the selected background area 922 may be applied to the matching area 906 of the first image.

Meanwhile, the user may obtain a result image resulting from applying the selected image effect to the corresponding area in the first image 905 by selecting at least one of the second images corresponding to the image effects but, alternatively, when at least one is selected from among the plurality of identified areas 906, 907, 908, and 909 in the first image 905, display the recommended image effects related to the selected area in the second area. As such, it may be possible to apply different image effects to a desired area according to user selection.

Figure 10:
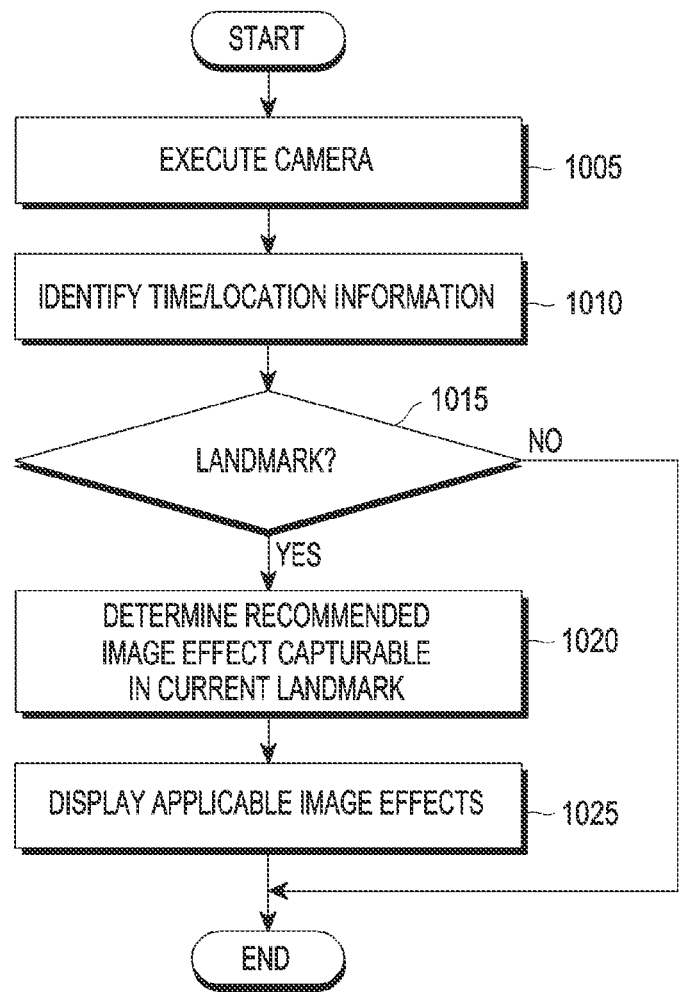
FIG. 10 is a flowchart illustrating an example operation for providing landmark-based image effects according to various embodiments.
Figure 11:
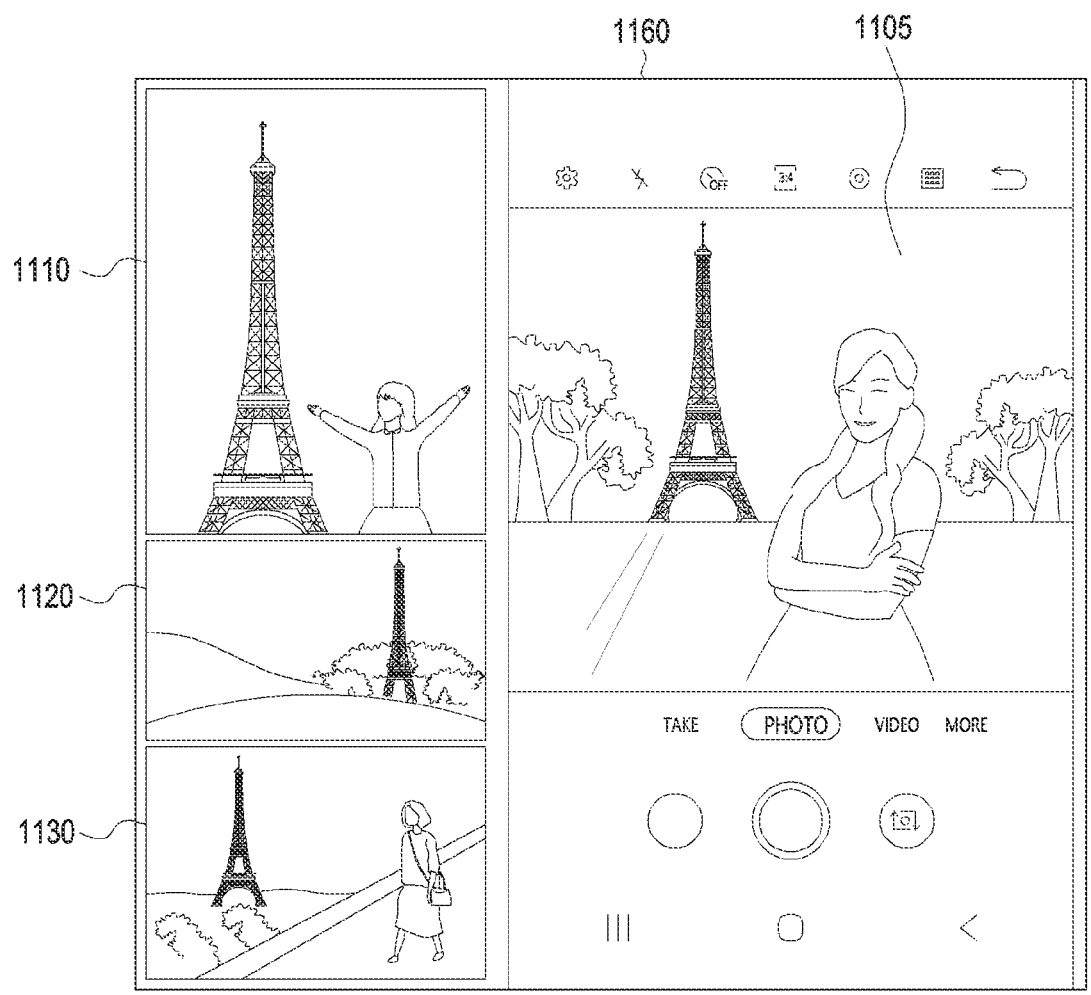
FIG. 11 is a view illustrating an example screen displaying landmark-based applicable image effects according to various embodiments.

FIG. 10 is a flowchart illustrating an example operation for providing landmark-based image effects according to various embodiments. FIG. 10 may be described with reference to FIG. 11 for a better understanding. FIG. 11 is a view illustrating an example screen displaying landmark-based applicable image effects according to various embodiments.

Referring to FIG. 10, in operation 1005, the electronic device 301 may execute the camera and, in operation 1010, identify time and location information when an image is captured. In operation 1015, the electronic device 301 may identify whether a landmark is included in the image. In response to inclusion of a landmark, in operation 1020, the electronic device 301 may determine a recommended image effect capturable on the current landmark. In operation 1025, the electronic device 301 may display applicable image effects.

Referring to FIG. 11, the electronic device 301 may display recommended images 1110, 1120, and 1130 in relation to the first image displayed on the display 1160 to allow the user to capture in an optimal place and capture angle (or capture composition).

According to an embodiment, the electronic device 301 may display recommended images corresponding to the image effect including at least one of filter, composition, exposure, white balance, or HDR correction applicable to the current scene (e.g., the first image 1105) using such information as the time, place, weather, or landmark when the photo is captured, in the second area (e.g., effect suggested area) adjacent to the first area where the first image 1105 is displayed. Further, upon providing (or recommending) images related to the image effect, the electronic device 301 may use user context information (e.g., user profile, user schedule, address book, and capture context, e.g., what the user is currently doing), as well as such information as the time, place, or landmark. The image analysis associated with the current scene (e.g., first image 1105) may be performed in real-time during the preview by the electronic device 301 or server.

The effect proposed through such image analysis may be displayed in the second area. For example, various effects, such as the user's most preferred style effect, the fastest search effect, or the most popular effect on SNS, may be recommended based on the user context information.

According to an embodiment, the electronic device 301 may analyze the time, place, weather, or preview image when the photo is captured and may thus analyze whether the user is located near the landmark (e.g., the Eiffel Tower) or an object corresponding to the Eiffel Tower is included in the preview image. If the current capture place is the landmark as a result of the analysis, the electronic device 301 may display recommended images 1110, 1120, and 1130 searched in relation to the first image 1105 by the server 205, to allow the user to capture in the optimal state, e.g., by referring to the recommended images or according to the capture composition or pose.

According to an embodiment, the searched recommended images 1110, 1120, and 1130 may be searched first based on user context information. For example, the recommended images may be ones searched based on at least one of the information about the SNS account followed by the user, information about the account with 'likes' on SNS, and 'favorite' information stored in the electronic device 301. As such, the user may select a desired filter by referring to the recommended images or follow a desired capture pose and may thus obtain a result image to which such image effects as a desired capture composition, filter, or capture method, have been applied when the capture is done.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may, for example, refer to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera;
a display;
at least one processor including processing circuitry; and
memory storing executable instructions,
wherein the instructions, when executed by the at least one processor individually or collectively, cause the electronic device to:
 display a first image obtained through the camera in a first display area of the display;
 identify a plurality of areas included in the first image;
 identify a plurality of image effects applicable to the plurality of areas;
 based on designating a partial area of the first image from among the plurality of areas, display a plurality of second images related to the partial area of the first iamge and to which image effects of the plurality of image effects are applied, respectively, wherein the plurality of second images are dipslayed in a second display area adjacent to the first display area and wherein at least one of the plurality of second images comprises a plurality of separately selectable areas to which different image effects are applied;
 based on identifying selection of one of the plurality of selectable areas in the second display area, display a third image resulting from applying an image effect to the partial in the first display area; and
 based on identifying a touch on the partial area in the first display area, cancel the image effect applied to the partial area in the first display area.

2. The electronic device of claim 1, wherein instructions, when executed by the at least one processor individually or collectively, cause the electronic device to:
 provide information about the first image to a server,
 obtain, from the server, the plurality of image effects, based on the information about the first image, and
 provide the plurality of second images to which the plurality of image effects obtained from the server is applied.

3. The electronic device of claim 2, wherein the information about the first image includes at least one of a capture time, capture place, weather, or user context information about the first image.

4. The electronic device of claim 1, wherein instructions, when executed by the at least one processor individually or collectively, cause the electronic device to:
 recognize at least one object in the first image,
 segment the first image into a main object, an auxiliary object, and a background based on a recognition result, and
 identify the plurality of areas as respectively including the main object, the auxiliary object, and the background.

5. The electronic device of claim 1, wherein instructions, when executed by the at least one processor individually or collectively, cause the electronic device to:
 provide information about the designated partial area to a server,
 obtain, from the server, image effects based on the information about the designated partial area, and
 provide the plurality of second images to which the image effects obtained from the server are applied.

6. The electronic device of claim 1, wherein the plurality of second images are images in which a different image effect is applied to each of the plurality of areas.

7. The electronic device of claim 1, wherein the plurality of image effects include at least one of a filter, white balance, camera exposure value adjustment, high dynamic range (HDR) correction, or noise correction.

8. The electronic device of claim 1, wherein instructions, when executed by the at least one processor individually or collectively, cause the electronic device to, in response to a plurality of images being selected from among the plurality of second images, obtain the third image by applying image effects corresponding to each of the selected plurality of images to respective corresponding areas among the plurality of areas included in the first image.

9. A method for providing an image-based image effect by an electronic device, the method comprising:
 displaying a first image obtained through a camera in a first display area of a display of the electronic device;
 identifying a plurality of areas included in the first image;
 identifying a plurality of image effects applicable to the plurality of areas;
 based on designating a partial area of the first image from among the plurality of areas, displaying a plurality of second images related to the partial of the first image and to which image effects of the plurality of image effects are applied, respectively, wherein the plurality of second images are displayed in a second display area adjacent to the first display area and wherein at least one of the plurality of second images comprises a plurality of separately selectable areas to which different image effects are applied;

based on identifying selection of one of the plurality of selectable areas in the second display area, displaying a third image resulting from applying an image effect to the partial area in the first display area; and based on identifying a touch on the partial area in the first display area, cancel the image effect applied to the partial area in the first display area.

10. The method of claim 9, further comprising:

providing information about the first image to a server;

obtaining, from the server, the plurality of image effects based on the information about the first image; and providing the plurality of second images to which the plurality of image effects obtained from the server are applied.

11. The method of claim 10, wherein the information about the first image includes at least one of a capture time, capture place, weather, or user context information about the first image.

12. The method of claim 9, wherein identifying the plurality of areas included in the first image includes:

recognizing at least one object in the first image;

segmenting the first image into a main object, an auxiliary object, and a background based on a recognition result; and identifying the plurality of areas as respectively including the main object, the auxiliary object, and the background.

13. The method of claim 9, further comprising:

providing information about the designated partial area to a server;

obtaining, from the server, image effects based on the information about the designated partial area; and providing the plurality of second images to which the image effects obtained form the server are applied.

14. The method of claim 9, wherein the plurality of second images are images in which a different image effect is applied to each of the plurality of areas.

15. The method of claim 9, wherein the plurality of image effects includes at least one of a filter, white balance, camera exposure value adjustment, high dynamic range (HDR) correction, or noise correction.

16. The method of claim 9, further comprising:

in response to a plurality of images being selected from among the plurality of second images, obtaining the third image by applying image effects corresponding to the selected plurality of images to respective corresponding areas among the plurality of areas included in the first image.

17. A non-transitory storage medium storing instructions that, when executed by at least one processor of an electronic device individually or collectively, cause the electronic device to perform a plurality of operations, the plurality of operations comprising:

displaying a first image obtained through a camera in a first display area of a display of the electronic device;

identifying a plurality of areas included in the first image;

identifying a plurality of image effects applicable to the plurality of areas;

based on designating a partial area of the first image from among the plurality of areas, displaying a plurality of second images related to the partial area and to which image effects of the plurality of image effects are applied, wherein the plurality of second images are displayed respectively, wherein the plurality of second images are displayed in a second display area adjacent to the first display area and wherein at least one of the plurality of second images comprises a plurality of separately selectable areas to which different image effects are applied;

based on identifying selection of one of the plurality of selectable areas in the second display area, displaying a third image resulting from applying an image effect to the partial area of in the first display area; and based on identifying a touch on the partial area in the first display area, cancel the image effect applied to the partial area in the first display area.

* * * * *